United States Patent Office.

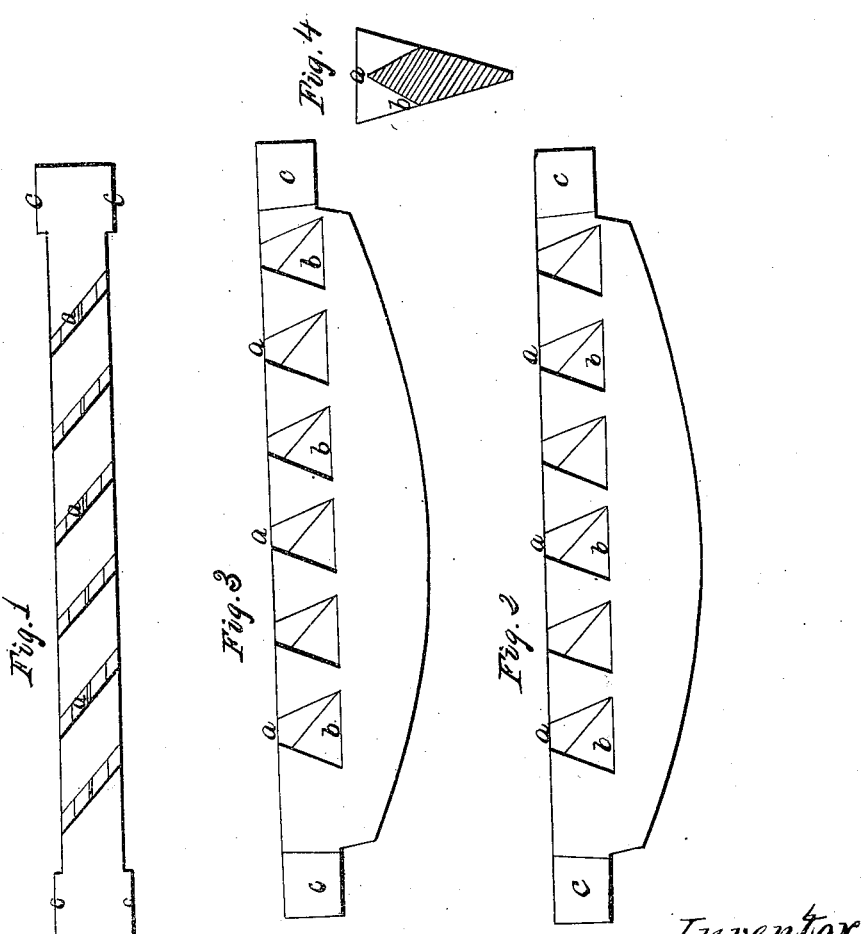

HENRY COLLINSON, OF BOSTON, ASSIGNOR TO HIMSELF AND SAMUEL VANCE, OF SOUTH BOSTON, AND SAMUEL VANCE, ASSIGNOR TO JAMES O. BOYLE, OF BOSTON, MASSACHUSETTS.

Letters Patent No. 77,458, dated May 5, 1868.

IMPROVEMENT IN GRATE-BARS.

The Schedule referred to in these Letters Patent and making part of the same.

TO ALL PERSONS TO WHOM THESE PRESENTS MAY COME:

Be it known that I, HENRY COLLINSON, of Boston, in the county of Suffolk, and State of Massachusetts, have invented an Improved Grate-Bar for Furnaces; and do hereby declare the same to be fully described in the following specification, and represented in the accompanying drawings, of which—

Figure 1 is a top view,

Figures 2 and 3 opposite side elevations, and

Figure 4 a transverse section of it, such section being taken obliquely or through the middle of one of its lateral grooves.

This grate-bar is triangular or trapezoidal in shape in transverse section, the larger base of it being upward.

Through this bar, and down a short distance from its upper surface, which may be flat, concave, or convex, grooves, $a\ a\ a$, are made laterally. Each of them may be arranged at right angles with the edges of the bar, but I prefer to run them obliquely across the bar, in manner as represented in the drawings.

Each of the said grooves grows wider as it descends, and its bottom, instead of being a plane, is sloped in opposite directions, in manner as shown at $b\ b$ in fig. 3. Shoulders, $c\ c$, may be formed on the grate-bar, at its ends, in order to cause a space to be between it and the next bar when placed against it.

From the above, it will be seen that with my improved grate-bar, ashes may be discharged through it as well as between it and the next adjacent bar, when a series of such bars is arranged in a furnace or fireplace.

By making the bar with the transverse grooves or passages sloped in either one or two directions on the bottom of each, and with each of such passages to increase in width as it may descend in the bar, we have extra means of discharging ashes over what is usually found in a grate.

By having the transverse passages arranged obliquely across the bar, a rake, when used in this furnace, will not be so liable to catch in the passages as it would be were they arranged square to the bar.

I do not claim a grate-bar constructed with air-passages arranged within it in manner or in the ways as explained in the English patent of Martin and Purdie, described in Repertory of Patents, fifth series, vol. xxxv, 1860.

I claim a grate-bar, as made, with its air-passages extended entirely across it.

I also claim the arrangement of the transverse passages obliquely in the bar, in manner as specified.

I also claim the grate-bar, as made, with air-passages extending across it, and to increase in width from their upper to their lower parts, as specified.

H'Y COLLINSON.

Witnesses:
R. H. EDDY,
F. P. HALE, Jr.